United States Patent
Hendzel et al.

(10) Patent No.: US 11,035,467 B2
(45) Date of Patent: Jun. 15, 2021

(54) GASKET FOR A WIPER SYSTEM, A GASKET-BRACKET ASSEMBLY FOR A WIPER SYSTEM COMPRISING SUCH A GASKET, A WIPER SYSTEM FOR AN AUTOMOTIVE VEHICLE COMPRISING SUCH A GASKET AND A METHOD FOR ASSEMBLING SUCH A GASKET IN A WIPER SYSTEM

(71) Applicant: Valeo Autosystemy Sp. z o.o., Skawina (PL)

(72) Inventors: Lukasz Hendzel, Skawina (PL); Roman Machacz, Skawina (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 10 days.

(21) Appl. No.: 16/021,781

(22) Filed: Jun. 28, 2018

(65) Prior Publication Data
US 2019/0003593 A1 Jan. 3, 2019

(30) Foreign Application Priority Data

Jun. 29, 2017 (EP) ..................................... 17461562

(51) Int. Cl.
*F16J 15/08* (2006.01)
*B60S 1/04* (2006.01)
*B60S 1/08* (2006.01)

(52) U.S. Cl.
CPC ........... *F16J 15/0818* (2013.01); *B60S 1/045* (2013.01); *B60S 1/0438* (2013.01); *B60S 1/0444* (2013.01); *B60S 1/08* (2013.01); *F16J 2015/0862* (2013.01)

(58) Field of Classification Search
CPC ............ F16J 15/0818; F16J 2015/0862; B60S 1/0438; B60S 1/0444; B60S 1/045; B60S 1/08
See application file for complete search history.

(56) References Cited

U.S. PATENT DOCUMENTS

| | | | | |
|---|---|---|---|---|
| 4,750,878 A | * | 6/1988 | Nix .......................... | B25B 27/28 384/296 |
| 5,507,585 A | * | 4/1996 | Diederich ................. | B60S 1/34 15/250.3 |

(Continued)

FOREIGN PATENT DOCUMENTS

| | | |
|---|---|---|
| DE | 102005061385 A1 | 6/2007 |
| FR | 2748436 A1 | 11/1997 |
| FR | 2749243 A1 | 12/1997 |

OTHER PUBLICATIONS

The European Search Report and European Search Opinion issued in corresponding European Application No. 17461562.5, dated Dec. 18, 2017 (6 pages).

*Primary Examiner* — Gilbert Y Lee

(74) *Attorney, Agent, or Firm* — Osha Bergman Watanabe & Burton LLP

(57) ABSTRACT

The invention is related to a gasket for a wiper system, the wiper system comprising a bracket and a motor barrel. The gasket comprises an opening for receiving the motor barrel, an engaging means arranged around the opening for engaging the bracket. The engaging means comprises at least one dividing means for providing discontinuity of the engaging means. The invention is also related to a gasket-bracket assembly comprising such a gasket. The invention is further related to a wiper system for an automotive vehicle comprising such a gasket. Furthermore, the invention is related to a method for assembling a gasket in a wiper system.

12 Claims, 5 Drawing Sheets

(56) References Cited

U.S. PATENT DOCUMENTS 5,675,862 A * 10/1997 Reinl .................. B60S 1/34
                                                  15/250.3
6,238,094 B1    5/2001 Schabanel et al.

* cited by examiner

GASKET FOR A WIPER SYSTEM, A GASKET-BRACKET ASSEMBLY FOR A WIPER SYSTEM COMPRISING SUCH A GASKET, A WIPER SYSTEM FOR AN AUTOMOTIVE VEHICLE COMPRISING SUCH A GASKET AND A METHOD FOR ASSEMBLING SUCH A GASKET IN A WIPER SYSTEM

FIELD OF THE INVENTION

The present invention, in general, is related to a gasket for a wiper system. The present invention is related further to a gasket-bracket assembly for a wiper system comprising such a gasket. The present invention is related also to a wiper system for an automotive vehicle comprising such a gasket. Furthermore, the present invention is related to a method for assembling such a gasket in a wiper system.

BACKGROUND OF THE INVENTION

A wiper system in modern vehicles comprises generally an electric motor assembly for providing movement to at least one wiper to wipe a windscreen or a rear window of a vehicle. The electric motor assembly comprises further a bracket combined with a cover of an electric motor and/or a gearbox. The electric motor assembly is further attached to the vehicle via said bracket. The electric motor assembly comprises also a gasket provided on the bracket to seal the electric motor assembly from environment to protect the assembly especially against water and dirt. In the conventional wiper systems, a gasket is preassembled with the bracket before assembling in the electric motor assembly. Then, the gasket-bracket assembly is mounted in an electric motor assembly.

In the conventional wiper systems, the gasket is assembled with the bracket by a snap fit provided around of an opening in the gasket for a motor barrel, the snap fit being engaged the bracket around an aperture. The snap fit is generally in form of a ring with an endless hook for engaging the bracket, the hook being arranged at the top of said ring, as in typical snap fits known in the state of the art. During assembling the gasket with the bracket, the snap fit is being inserted from one side of the bracket through the aperture and is being engaged said bracket on its other side.

Nonetheless, the above described snap fit for assembling the gasket with the bracket for a wiper system suffers from serious disadvantages. Namely, it is quite difficult to assembly the gasket with the bracket with such a snap fit because said snap fit generates quite severe resistance when passing through the aperture of the bracket. As a consequence, these is a reasonable chance that the engagement of the gasket with the bracket would be improper. Moreover, more time is required to assure proper and complete assembly of the gasket with the bracket wherein a snap fit of the gasket is fully and reliably engaged the bracket at any point of the snap fit, lengthening thereby time of assembling of the gasket-bracket assembly.

Because of the above, there is still demand for a gasket for a wiper system, especially for an automotive vehicle, comprising an engaging means for engaging a gasket with a bracket which provides improved engagement of the gasket with the bracket in a basket-bracket assembly, the engagement being also capable to be formed more quickly.

SUMMARY OF THE INVENTION

The first aspect of the present invention provides a gasket for a wiper system, the wiper system comprising a bracket and a motor barrel. The gasket comprises an opening for receiving the motor barrel, an engaging means arranged around the opening for engaging the bracket, characterized in that the engaging means comprises at least one dividing means for providing discontinuity of the engaging means.

The gasket according to the present invention comprising the engaging means with at least one discontinuity, as described above, is more easily mountable in a wiper system. Moreover, the gasket according to the present invention provides the engaging means assuring full and reliable engagement in the wiper system.

In a preferred embodiment of the gasket, the engaging means comprises from two to six dividing means.

In another preferred embodiment of the gasket, the engaging means comprises four dividing means.

In yet another preferred embodiment of the gasket, the dividing means in the engaging means are symmetrically arranged around the opening of the gasket.

In yet further preferred embodiment of the gasket, the dividing means is independently selected from the group comprising a cut, a slit, and a relief.

In another preferred embodiment of the gasket, said gasket comprises further an immobilizing means adapted to engage the bracket for fixing movement of the gasket with respect to the bracket. The gasket with the immobilizing means facilitates further assembling said gasket in a wiper system by fixing its unintentional movement.

In yet another preferred embodiment of the gasket, the immobilizing means is adapted to fix rotational movement of the gasket with respect to the bracket about the opening of the gasket.

In further preferred embodiment of the gasket, the immobilizing means is a lug with a hole for engaging a protrusion provided further with the bracket.

In yet further preferred embodiment of the gasket, the engaging means are adapted to engage around of an aperture, the aperture being provided further in the bracket.

In further preferred embodiment of the gasket, the engaging means is a snap fit joint adapted to snap with the bracket.

Another aspect of the present invention provides a gasket-bracket assembly for a wiper system, the system comprising a motor barrel. The gasket-bracket assembly comprises a bracket, a gasket comprising an opening for receiving the motor barrel, an engaging means arranged around the opening and engaged the bracket, characterized in that the engaging means comprises at least one dividing means for providing discontinuity of the engaging means.

The gasket-bracket assembly according to the present invention is more quickly mountable reducing thereby time and cost of assembly of a wiper system. The gasket-bracket assembly according to the present invention comprises full and reliable engagement of the gasket and the bracket in the assembly.

In a preferred embodiment of the gasket-bracket assembly, the engaging means of the gasket comprises from two to six dividing means.

In another preferred embodiment of the gasket-bracket assembly, the engaging means of the gasket comprises four dividing means.

In yet another preferred embodiment of the gasket-bracket assembly, the dividing means in the engaging means are symmetrically arranged around the opening of the gasket.

In yet further preferred embodiment of the gasket-bracket assembly, the dividing means of the engaging means in the gasket is independently selected from the group comprising a cut, a slit, and a relief.

In another preferred embodiment of the gasket-bracket assembly, the gasket comprises further an immobilizing means adapted to engage the bracket for fixing movement of the gasket with respect to the bracket. The immobilizing means fixes movement of the gasket with respect to the bracket in the gasket-bracket assembly, further facilitating thereby assembling said gasket-bracket assembly in a wiper system.

In yet another preferred embodiment of the gasket-bracket assembly, the immobilizing means of the gasket is adapted to fix rotational movement of the gasket with respect to the bracket about the opening of the gasket.

In further preferred embodiment of the gasket-bracket assembly, the immobilizing means of the gasket is a lug with a hole for engaging a protrusion provided further in the bracket.

In yet further preferred embodiment of the gasket-bracket assembly, the bracket comprises further an aperture and the engaging means of the gasket engaged the bracket around the aperture.

In further preferred embodiment of the gasket-bracket assembly, the engaging means of the gasket is a snap fit joint adapted to snap with the bracket.

Further aspect of the present invention provides a wiper system for an automotive vehicle, the wiper system comprising the gasket, as specified above.

The wiper system according to the present invention features all the benefits of the gasket and the gasket-bracket assembly, as specified above.

Yet another aspect of the present invention provides a method for assembling a gasket in a wiper system, the wiper system comprising a motor barrel, the method comprising steps of providing a gasket comprising an opening for receiving the motor barrel and an engaging means arranged around the opening for engaging the bracket, the engaging means comprising at least one dividing means for providing discontinuity of the engaging means, providing a bracket, engaging the gasket with the bracket with the engaging means.

The method of for assembling the gasket in a wiper system according to the invention is realized more quickly compared to the technical solution known in the state of the art. In a consequence the method lowers costs of assembling of the gasket. Moreover, the method according to the present invention provides full and reliable engagement of the gasket in the wiper system.

In a preferred embodiment of the method, engaging the gasket with the bracket is realized with a tool for engaging the engaging means with the bracket.

In another preferred embodiment of the method, the tool is adapted for inserting into the opening of the gasket.

In yet another preferred embodiment of the method, said method comprises further the step of engaging an immobilizing means with the bracket for fixing movement of the gasket with respect to the bracket, the immobilizing means being provided further in the gasket.

In further preferred embodiment of the method, engaging means of the gasket are being engaged around of an aperture, the aperture being provided further in the bracket.

BRIEF DESCRIPTION OF THE DRAWINGS

Further characteristics and advantages of the invention will become more apparent from the following detailed description of preferred, but not exclusive, embodiments of the invention, illustrated by way of non-limiting examples in the accompanying drawings, wherein.

DETAILED DESCRIPTION OF THE PREFERRED EMBODIMENTS

Figure 1:
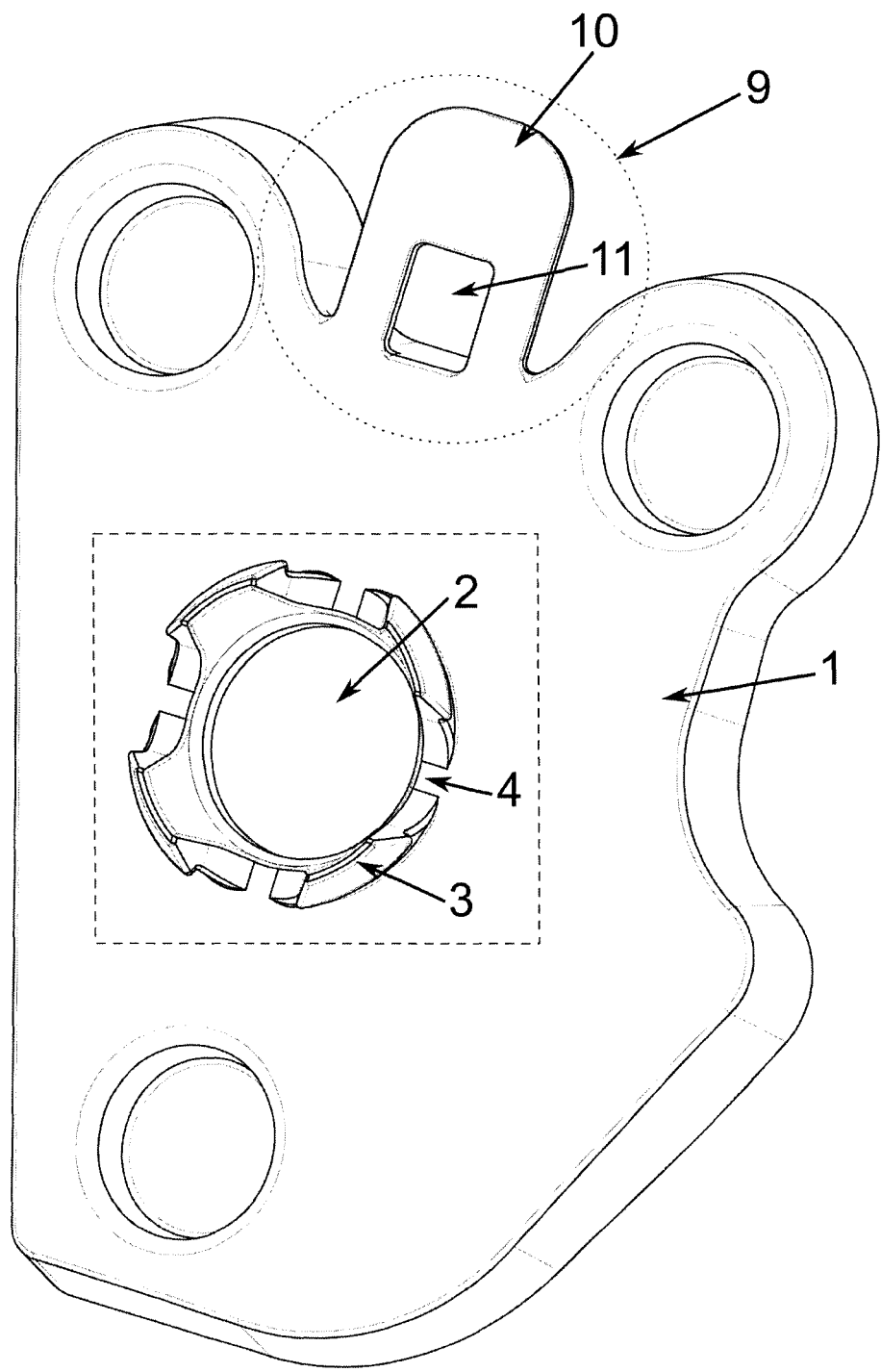
FIG. 1 shows a perspective view of a gasket according to one of the preferred embodiments.

Referring now to figs, and initially to FIG. 1, a perspective view of a gasket 1 according to one of the preferred embodiments of the invention is shown. The gasket 1 comprises generally flat body made of a resilient material providing tightness of a gasket-bracket assembly 7. The body of the gasket 1 comprises an opening 2 located generally in the center of said body, as shown in FIG. 1. The opening 2 may be located at any place of the body of the gasket 1 depending on the requirements (not shown in FIGS.

The gasket 1 comprises an engaging means 3 arranged around the opening 2, as shown in FIG. 1. The engaging means 3 comprises a protrusion extending generally perpendicularly out the body of the gasket 1. The protrusion comprises in its end a projection comprising engaging surface for engaging the corresponding surface of the bracket 5. The above described engaging means 3 forms, therefore, a joint called a snap fit joint, the snap fit being arranged around the opening 2 of the gasket 1.

Figure 2:
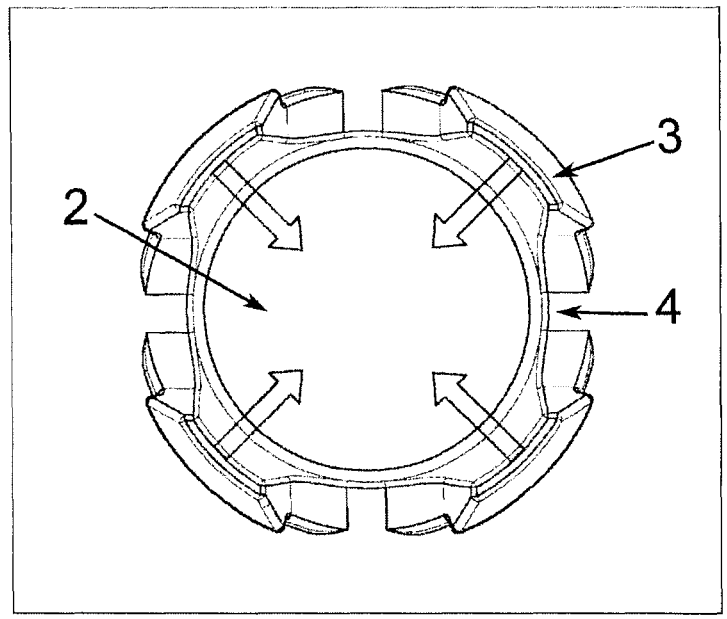
FIG. 2 shows a front view of the engaging means of the gasket, as shown in the dashed rectangle in FIG. 1.
Figure 3:
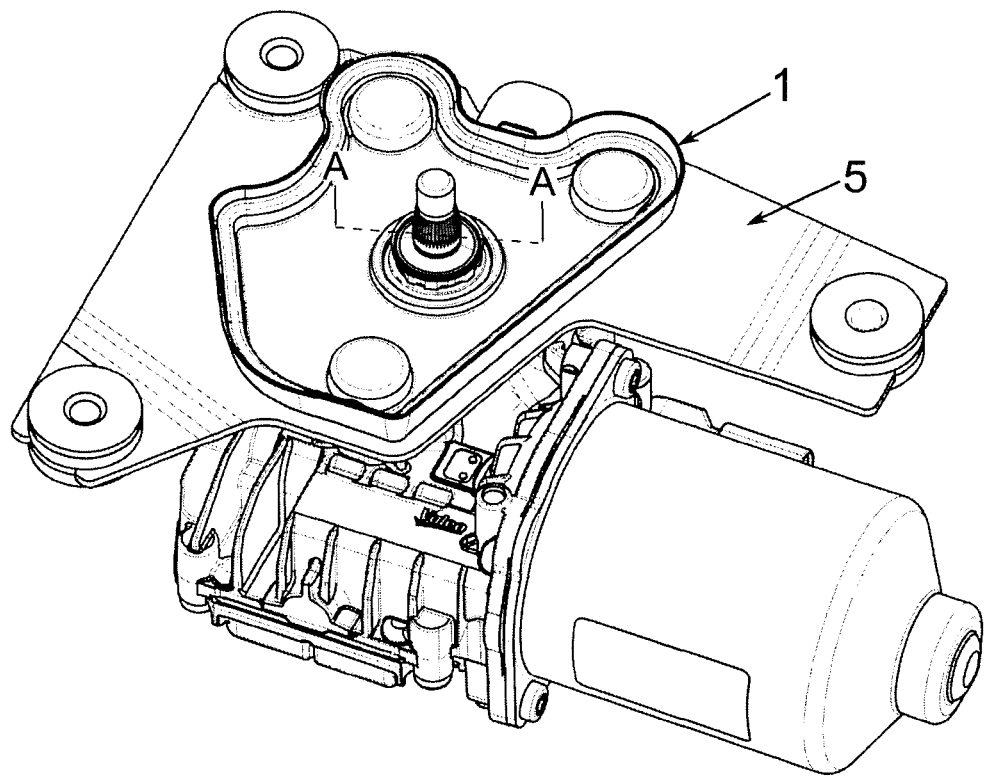
FIG. 3 shows a perspective view of an electric motor assembly comprising the gasket, as shown in FIG. 1.

The engaging means 3 comprises at least one dividing means 4 for providing discontinuity of said engaging means 3. Discontinuity provides the ends to the engaging means 3 to allow said engaging means 3 to deform more easily facilitating assembling the gasket 1. In one of the preferred embodiments of the invention, the dividing means 4 is just a simple cut. In such a case, the ends of the engaging means are only in a mutual contact. During assembling the gasket 1, the ends of the engaging means 3 shift with respect to each other with overlapping and slightly moving simultaneously into the opening 2, facilitating thereby engaging the gasket 1 with the bracket 5. In a more preferred embodiment of the gasket 1, the dividing means 4 is a slit or cut-out, as shown in FIG. 2. In such a case, the slit provides room for unconstrained deformation of the engaging means 3. During assembling, the ends of the engaging means move unrestricted into the opening 2, as shown schematically with the arrows in FIG. 2, facilitating thereby engaging the gasket 1 with the bracket 5. In a preferred embodiment the engaging means 3 with one dividing means 4 forms a discrete snap fit being arranged around the opening 2 of the gasket 1.

In other preferred embodiment of the gasket 1, the engaging means 3 comprises more than one dividing means 4, dividing therewith the engaging means 3 into at least two parts. Preferably, the engaging means 3 comprises from two to six dividing means 4. More preferably, the engaging means 3 comprises four dividing means 4, as shown in FIGS. 1 and 2. The dividing means 4 may be arranged in any pattern in the engaging means 3, depending on needs and purposes. In a preferred embodiment of the gasket 1, the dividing means 4 are evenly distributed within the length of the engaging means 3. The inventors have determined experimentally that the best engaging performance was observed for gasket 1 with the engaging means 3 comprising four dividing means 4 in a form of cut-outs, the cut-outs being symmetrically arranged around the opening 2, as shown in FIGS. 1 and 2. In a preferred embodiment of the gasket, the engaging means 3 with four dividing means 4 forms a discrete snap fit being arranged around the opening 2 of the gasket 1, the snap fit comprising four-part snap fit, as shown in FIGS. 1 and 2. The four part snap fit is bendable into the opening 2 of the gasket 1, as shown schematically with the arrows in FIG. 2.

The gasket 1 comprises further at least one immobilizing means 9 for preventing, when assembled, from movement of the gasket 1 with respect to the bracket 5, especially from rotation about the engaging means 3 of the gasket 1. In one of the preferred embodiments of the gasket 1, immobilizing means 9 is in a form of a lug 10, being arranged on a side of the body of the gasket 1, as shown in FIG. 1. The lug 10 comprises a hole 11 for engaging the bracket 5. In other embodiments of the gasket 1, the immobilizing means 9 is a protrusion arranged on the body between the opening 2 and the edge of said body of the gasket 1, comprising a cap at the end of the protrusion for engaging the bracket 5. Such an immobilizing means 9 is, therefore, in a form a mushroom-like joint (not shown in figs).

Figure 5:
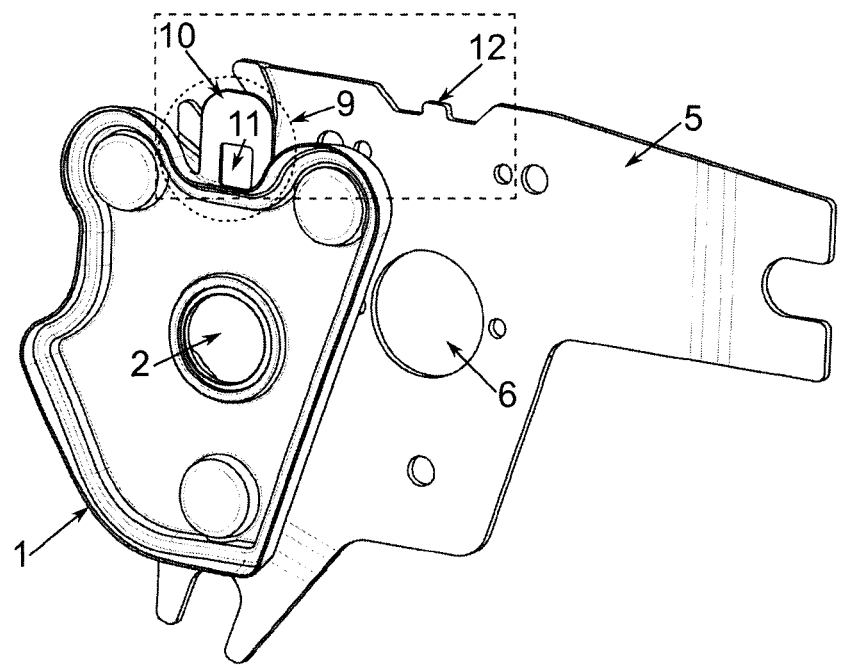
FIG. 5 shows schematically representation of a method of assembling of a gasket-bracket assembly according to one of the preferred embodiments of the invention.

The gasket 1, as described above, is for use in an electric engine assembly for a wiper system. The electric engine assembly comprises a bracket 5, the bracket 5 being for mounting the electric motor with a gearbox to an vehicle. The gasket 1 is assembled with the bracket 5 to provide tightness to the electric motor and the gearbox. The bracket 5 comprises a body, usually made of metal alloy. The body of the bracket 5 comprises an aperture 6 for accepting the engaging means 3 of the gasket 1. The aperture 6 may be located generally in the center of the body of the bracket 5, as shown in FIG. 5. The aperture 6 may also be located at any place of the body of the gasket 1 depending on the requirements (not shown in figs).

Figure 4:
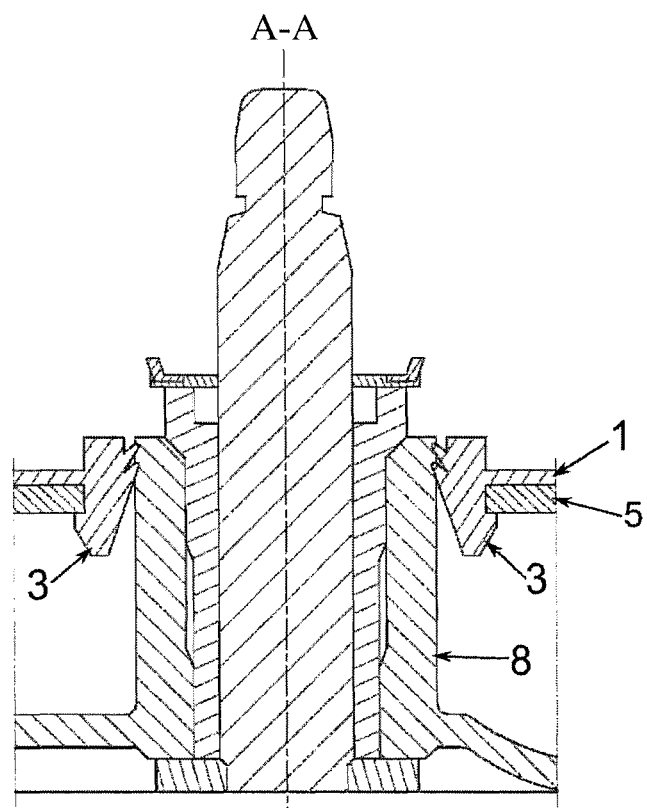
FIG. 4 shows a view of cross section of the electric motor assembly, taken along line A-A, as shown in FIG. 3.
Figure 8:
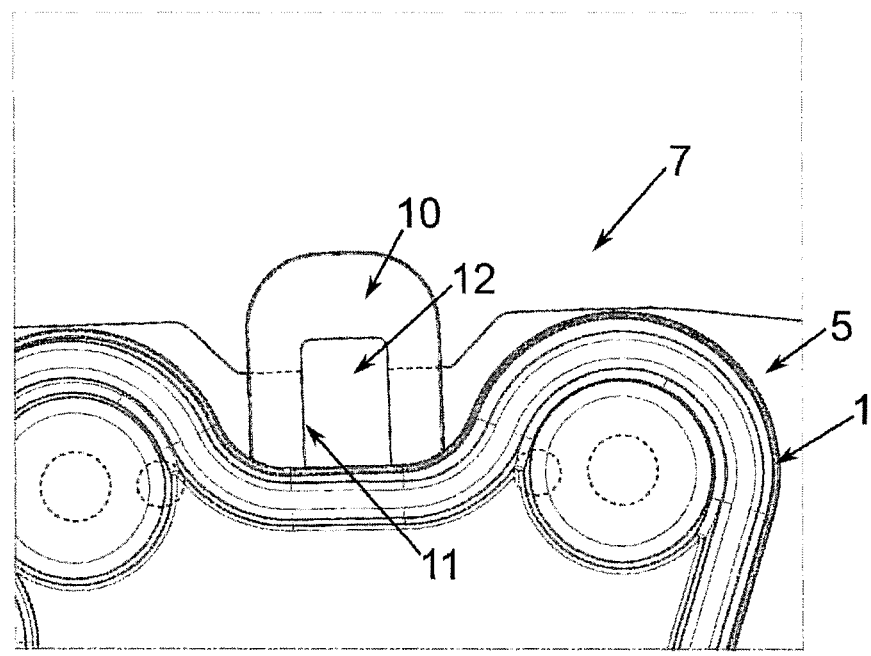
FIG. 8 shows an enlarged view of a part from FIG. 7, when assembled.

When assembled, the gasket 1 according to the invention is placed next to the bracket 5. Preferably the gasket 1 is in contact with the bracket 5. The engaging means 3 are engaged with the bracket 5 via the aperture 6 of the bracket 5, as shown in FIG. 4. A barrel 8 of the motor in placed in the opening 2 of the gasket 1 and tightly engages said gasket 1, as shown in FIG. 4. In a preferred embodiment of the gasket 1 comprising the immobilizing means 9, said means 9 are engaged with the bracket 5 to immobilize, especially against rotation, the gasket 1 with respect to the bracket 5. In a preferred embodiment, wherein the immobilizing means 9 of the gasket 1 comprises the lug 10 with the hole 11, as described above, said lug 10 is engaged by its hole 11 with a protrusion 12 provided correspondingly in the bracket 5, as shown in FIG. 8. In another preferred embodiment, wherein the immobilizing means 9 of the gasket is in a form of the mushroom-like joint, as described above, said mushroom-like joint is engaged with the hole provided correspondingly in the bracket 5 (not shown in the figs). The gasket 1 with fixed movement with respect to the bracket 5, as described above, facilitates mounting the electric motor assembly in a vehicle.

Figure 6:
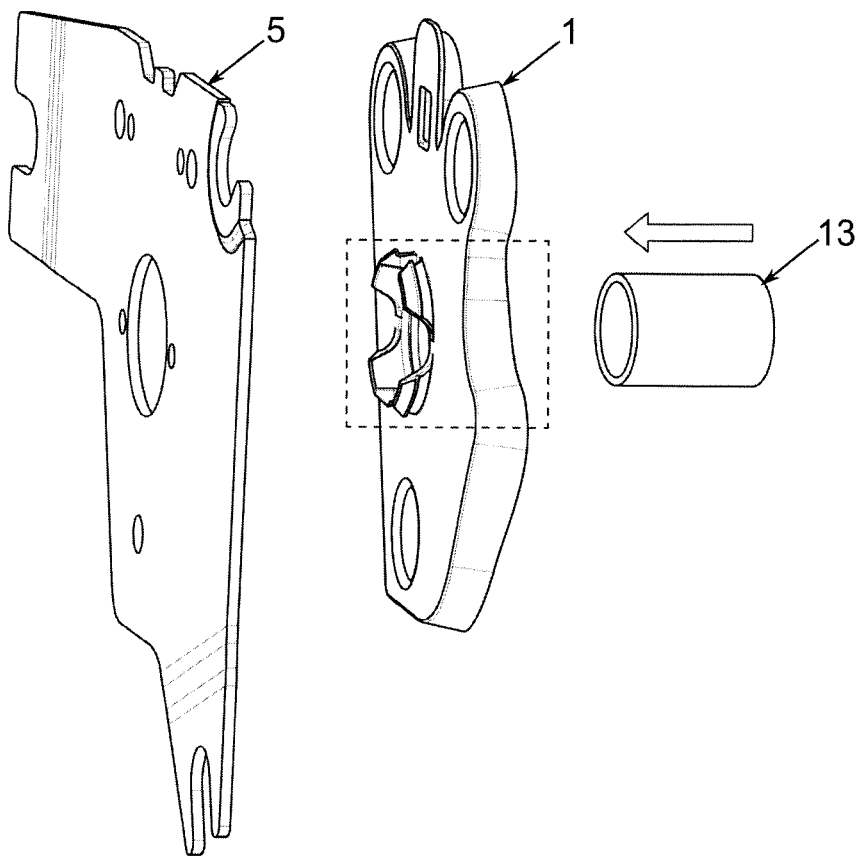
FIG. 6 shows side view of the representation of the method, as shown in FIG. 5, according to another preferred embodiment of the invention.

The present invention is related also to a method for assembling the gasket in a wiper system. The method comprises providing the gasket 1, as described above. The method comprises further providing the bracket 5, as described above. Then the gasket 1 is arranged next to the bracket 5, in such a way that the engaging means 3 of the gasket 1 is in a vicinity of the aperture 6 of the bracket 5, as shown in FIGS. 5 and 6. Then the engaging means 3 of the gasket 1 are moved over the aperture 6 in the bracket 5 and engaged on the other site of said bracket 5, providing herewith a gasket-bracket assembly 7. Next, the barrel 8 of the electric motor and the gear-box is placed in the opening 2 of the gasket, as shown in the FIG. 4, and the bracket 5 is coupled with the electric motor and gearbox respectively, providing herewith an electric motor assembly for a wiper system.

In one of the preferred embodiments of the invention, the method of assembling according to the present invention involves use of a tool 13 for facilitating engaging the gasket 1 with the bracket 5, as shown in FIG. 6. In one of the preferred embodiments, the tool 13 comprises a rod for facilitating engagement of the gasket 1 with the bracket 5. In another preferred embodiment, the tool 13 comprises a sleeve for facilitating engagement of the gasket 1 with the bracket 5.

In a preferred embodiment of the method according to the present invention, the tool 13 is inserted into the opening 2 of the gasket, as shown schematically with the arrow in FIG. 6, to push away the engaging means 3 of the gasket 1 to assure correct and reliable engagement of said engagement means 3 of the gasket 1 with the bracket 5, as shown in FIG. 4.

Figure 7:
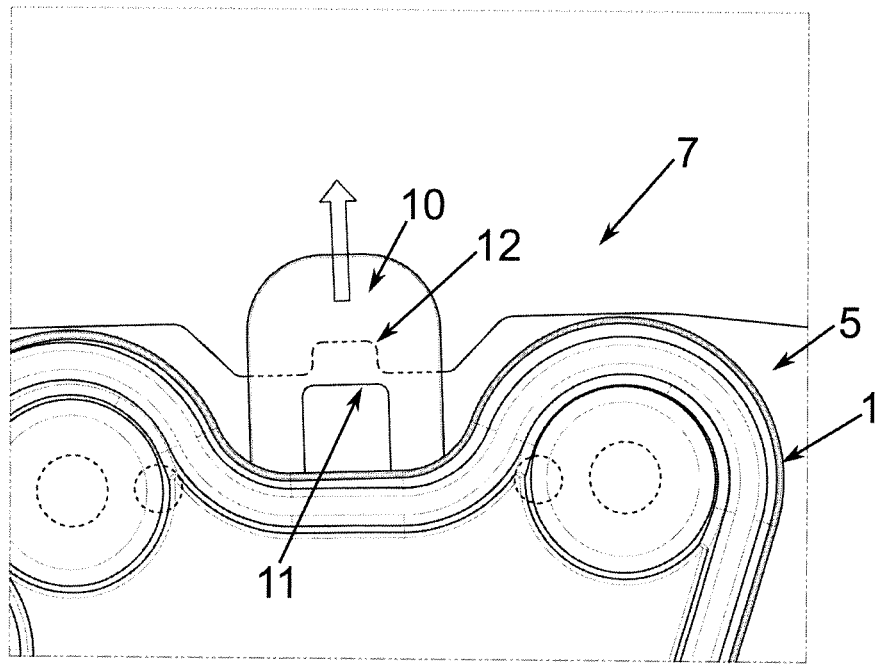
FIG. 7 shows schematically an enlarged view of a part of the representation of a step of engaging immobilizing means of the gasket according to one of the preferred embodiments of the invention.

In a preferred embodiment of the method according to the present invention, when the gasket 1 comprises the immobilizing means 9, as described above, the method comprises also engaging said immobilizing means 9 with the bracket 5. The step of engaging the immobilizing means 9 may be performed before, simultaneously or after engaging the engaging means 3 of the gasket 1 with the bracket 5, depending on the needs. In a preferred embodiment of the invention, wherein the immobilizing means 9 are in a form of the lug 10 with the hole 11, as described above, the step of engaging the immobilizing means 9 involves engaging the lug 10 via the hole 11 with the protrusion 12 in the bracket 5, as shown in FIGS. 7 and 8. In another preferred embodiment of the invention, wherein the immobilizing means 9 are in a form of mushroom-like joint, as described above, the step of engaging of the immobilizing means 9 involves engaging the cap of the mushroom-like joint of the gasket 1 with the corresponding hole in the bracket 5.

The invention, including its preferred embodiments, is described herein by the way of an example only. All the technical features, including those in the preferred embodiments, as described herein, may be combined to any extent and in any combination. All the possible combinations of the technical features are considered as being fully and unambiguously disclosed herein as complete and unequivocal individual embodiments of the present invention.

Although the present invention has been described in the context of an electric motor and a wiper motor for an automotive vehicle, the gasket according to the present invention may be used in any application in a wiper system wherein there is a need for fast and easy assembling the gasket comprising the engaging means. The gasket according to the present invention may also be used to reduce noise and to provide tightness against water and dirt for any other component in a wiper system. For example, the gasket according to the present invention may be used with a master link rod of a wiper system passing a car body to silence an operation of the wiper system and to tight the car body.

As described hereinabove, the present invention solves the problem of facilitating of assembling of the gasket in wiper systems. It should be appreciated that various changes in the components and arrangements, which have been described and illustrated herein in order to explain the nature of the invention, may be made by these skilled in the art without departing from the principle and scope of the invention, as defined in the appended claims.

Definitions 1 a gasket
2 an opening in the gasket 2
3 an engaging means
4 a dividing means in the engaging means 3
5 a bracket
6 an aperture in the bracket 5
7 a gasket-bracket assembly
8 a motor barrel
9 an immobilizing means in the gasket 1
10 a lug of the immobilizing means 9
11 a hole in the lug 10
12 a protrusion in the bracket 5
13 a tool for engaging a gasket 1 with a bracket 5

The invention claimed is:

1. A gasket for a wiper system, the wiper system comprising a bracket and a motor barrel, the gasket comprising:
   an opening for receiving the motor barrel;
   an engaging means arranged around the opening for engaging the bracket; and
   an immobilizing means comprising a lug with a hole for engaging a protrusion provided in the bracket,
   wherein the immobilizing means is configured to fix rotational movement of the gasket with respect to the bracket about the opening of the gasket, and
   wherein the engaging means comprises at least one dividing means for providing discontinuity of the engaging means.

2. The gasket according to the claim 1, wherein the engaging means comprises from two to six dividing means, and wherein the dividing means are symmetrically arranged around the opening of the gasket.

3. The gasket according to claim 1, wherein the dividing means is independently selected from the group comprising a cut, a slit, and a relief.

4. The gasket according to claim 1, wherein the engaging means are adapted to engage around of an aperture, the aperture being provided further with the bracket.

5. A wiper system for an automotive vehicle comprising a gasket as specified in claim 1.

6. A gasket-bracket assembly for a wiper system, the wiper system comprising a motor barrel, the assembly comprising:
   a bracket;
   a gasket comprising an opening for receiving the motor barrel;
   an engaging means arranged around the opening and engaged with the bracket; and
   an immobilizing means adapted to engage the bracket,
   wherein the immobilizing means is a lug with a hole for engaging a protrusion provided as part of the bracket,
   wherein the immobilizing means is configured to fix rotational movement of the gasket with respect to the bracket about the opening of the gasket, and
   wherein the engaging means comprises at least one dividing means for providing discontinuity of the engaging means.

7. The gasket-bracket assembly according to claim 6, wherein the engaging means comprises from two to six dividing means, and wherein the dividing means are symmetrically arranged around the opening of the gasket.

8. The gasket-bracket assembly according to claim 6, wherein the dividing means is independently selected from the group comprising a cut, a slit, and a relief.

9. The gasket-bracket assembly according to claim 6, wherein the bracket comprises further an aperture and the engaging means of the gasket are engaged the bracket around of the aperture.

10. A method for assembling a gasket in a wiper system, the system comprising a motor barrel, the method comprising:
    providing a bracket comprising a protrusion;
    providing a gasket comprising an opening for receiving the motor barrel an engaging means arranged around the opening for engaging with the bracket, and an immobilizing means configured to fix rotational movement of the gasket with respect to the bracket during opening of the gasket,
       wherein the engaging means comprises at least one dividing means for providing discontinuity of the engaging means,
       wherein the immobilizing means is a lug with a hole for engaging the protrusion provided as part of the bracket;
    and
    engaging the gasket with the bracket with the engaging means.

11. The method according to claim 10, wherein engaging the gasket with the bracket is realized with a tool for engaging the engaging means with the bracket the tool being adapted for inserting into the opening of the gasket.

12. The method according to claim 10, wherein the method further comprises engaging the immobilizing means with the bracket for fixing movement of the gasket with respect to the bracket, the immobilizing means being provided further with the gasket the engaging means being engaged around of an aperture, the aperture being provided further with the bracket.

* * * * *